(12) United States Patent
Kino et al.

(10) Patent No.: US 7,762,581 B2
(45) Date of Patent: Jul. 27, 2010

(54) HEAD-PROTECTING AIRBAG APPARATUS

(75) Inventors: Masao Kino, Aichi-ken (JP); Motoyuki Tanaka, Aichi-ken (JP); Kazumi Ichimaru, Aichi-ken (JP); Yasutomo Tsutsui, Inuyama (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 363 days.

(21) Appl. No.: 12/010,336

(22) Filed: Jan. 24, 2008

(65) Prior Publication Data
US 2008/0224452 A1  Sep. 18, 2008

(30) Foreign Application Priority Data
Jan. 30, 2007  (JP) .............................. 2007-019751

(51) Int. Cl.
*B60R 21/213* (2006.01)
(52) U.S. Cl. ................................. 280/730.2; 280/728.2
(58) Field of Classification Search ............. 280/730.2, 280/728.1, 728.2; *B60R 21/213*
See application file for complete search history.

(56) References Cited

U.S. PATENT DOCUMENTS

2002/0125697 A1*  9/2002  Heigl ...................... 280/730.2
2005/0057023 A1*  3/2005  Burton et al. ............ 280/730.2
2006/0255579 A1*  11/2006  Wallner et al. ............... 280/740
2009/0051149 A1*  2/2009  Kalandek et al. ......... 280/730.2
2009/0309339 A1*  12/2009  Massot et al. ............ 280/730.2

FOREIGN PATENT DOCUMENTS

JP        10-329634 A     12/1998

* cited by examiner

*Primary Examiner*—Ruth Ilan
(74) *Attorney, Agent, or Firm*—Posz Law Group, PLC

(57) ABSTRACT

The head-protecting airbag apparatus includes an airbag folded up in an elongative contour for covering a window of vehicle upon deployment, and a plurality of cases arranged along the length direction of the folded-up airbag for housing the airbag. The airbag apparatus is mounted on the vehicle by attaching mounting portions of the airbag along an upper periphery of the window together with the cases. The cases are connected by a bendable connecting member and thereby permitting the airbag stored in the cases to be transported in a bent state at the connecting member. The connecting member announces the occurrence of twisting of the airbag between the cases by shortening the distance between the cases for preventing the airbag from being mounted on the vehicle in a twisted state when the airbag apparatus is unfolded for mounting on the vehicle.

12 Claims, 13 Drawing Sheets

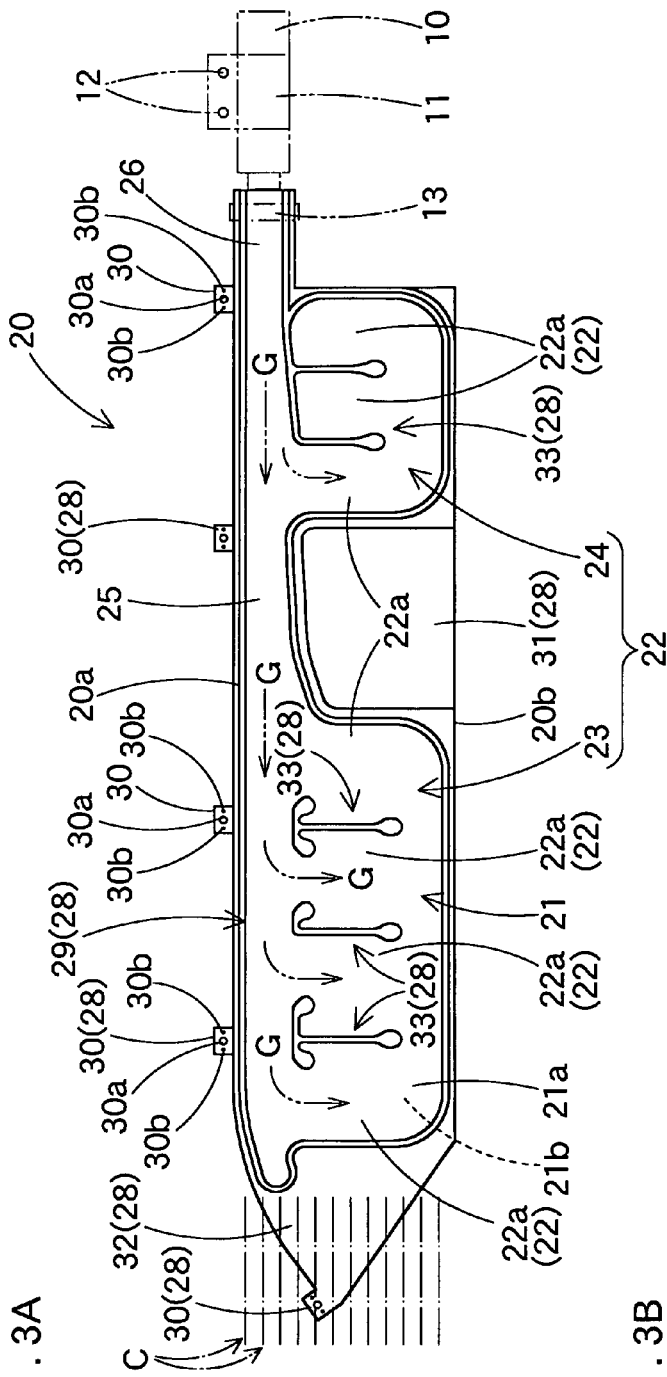
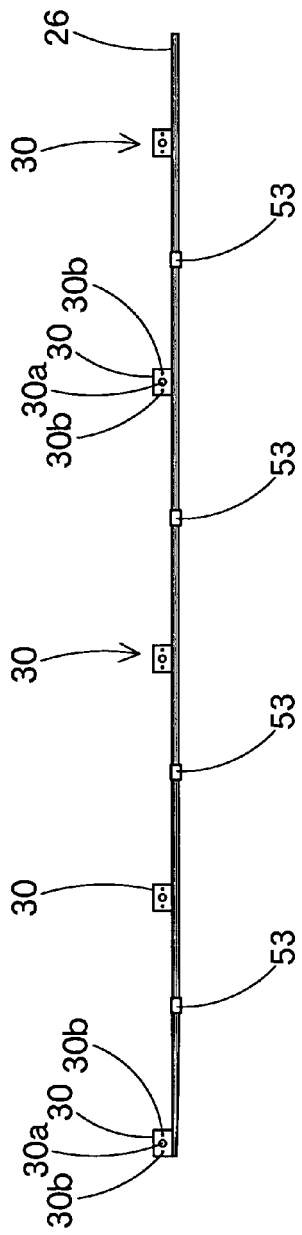
Fig. 3A
Fig. 3B

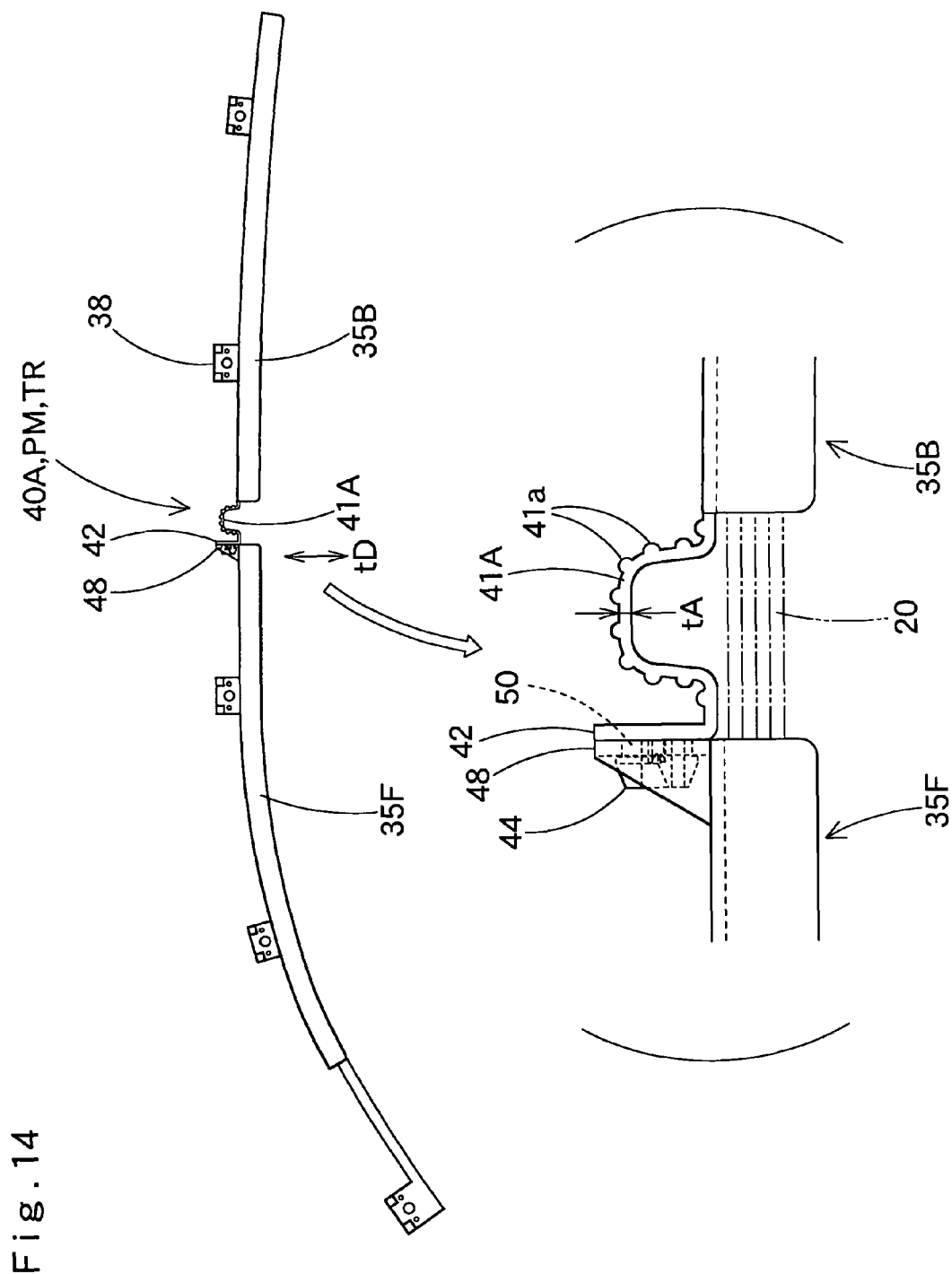

HEAD-PROTECTING AIRBAG APPARATUS

The present application claims priority from Japanese Patent Application No. 2007-019751 of Kino et al., filed on Jan. 30, 2007, the disclosure of which is hereby incorporated into the present application by reference.

BACKGROUND OF THE INVENTION

1. Field of the Invention

The present invention relates to a head-protecting airbag apparatus including a folded-up airbag for covering a window of a vehicle and a plurality of cases that house the airbag.

2. Description of Related Art

It is known in the prior art, for example as disclosed in JP 10-329634, that an airbag of the airbag apparatus of this kind is folded up and housed in a plurality of cases of synthetic resin arranged along the longitudinal direction of the folded-up airbag, in consideration of protection of the airbag before and after the mounting on the vehicle and convenience in handling. This airbag apparatus is mounted on the vehicle by attaching mounting regions of the airbag to a vehicle body along the upper peripheries of windows together with the cases. At transportation from a production plant to assembling plant, the airbag is bent into a compact contour between the cases.

When such an airbag apparatus is unfolded from the bent state for mounting on the vehicle, in some cases the airbag apparatus may be mounted on the vehicle with the airbag twisted between the cases, which may inhibit a smooth deployment of the airbag.

SUMMARY OF THE INVENTION

The present invention contemplates to solve the above-mentioned problem, and therefore, has an object to provide a head-protecting airbag apparatus which enables an airbag to be mounted on a vehicle without twisting though the airbag is bent and housed in a case composed of split parts during transportation.

The head-protecting airbag apparatus mountable on a vehicle includes an airbag, a plurality of cases for housing the airbag and a connecting member for connecting one case to another. The airbag is folded up in an elongative contour for covering a window of vehicle upon deployment. The airbag includes a plurality of mounting portions at which the airbag is mounted on a vehicle body along an upper periphery of the window. The cases are made from synthetic resin and arranged along the length direction of the folded-up airbag. The cases are mounted on the vehicle body together with the airbag when the mounting portions of the airbag are attached to the vehicle body. The connecting member is designed so bendable as to permit the airbag stored in the cases to be transported in a bent state at the connecting member before being mounted on the vehicle. The connecting member includes improper-assembly prevention means for preventing the airbag from being attached to the vehicle body in a twisted state between the cases at assembly on the vehicle.

The improper-assembly prevention means of the connecting member prevents the airbag from being mounted on the vehicle in a twisted state when the airbag is straightened from the bent state for assembly with the vehicle at the mounting portions. Since the connecting member is bendable, the airbag apparatus is bendable between the cases with the airbag stored in the cases, which is convenient for transportation.

Therefore, the airbag apparatus is capable of preventing the airbag from being mounted on a vehicle in an improper manner though the folded-up airbag is stored in more than one cases and bent during transportation.

If the improper-assembly prevention means is comprised of twist regulation means for preventing the connecting member from twisting, the airbag is prevented from twisting between the cases by preventing the twisting of the connecting member. Specifically, such twist regulation means is realized by forming the connecting member to include a band member of which sectional contour taken along a direction orthogonal to a connecting direction of the cases is a rectangle such that the connecting member is thin and bendable, and disposing a plurality of ribs extending orthogonal to the connecting direction on the band member side by side along the connecting direction. This configuration makes the connecting member bendable but untwistable. Alternatively, the twist regulation means may be comprised of reducing ease of twisting of the connecting member to such a degree as to permit bending, for example by increasing the width and thickness of the connecting member.

The improper-assembly prevention means is comprised of twist alarm means for annunciating of occurrence of twisting of the connecting member by designing the connecting member to be twisted along with twisting of the airbag between the cases. Such twist alarm means is comprised of a distance shortening mechanism that shortens a distance between the connected cases when the connecting member is twisted, for example by making the connecting member from an unextensible material. Specifically, if the distance between the connected cases is shortened when the connecting member is twisted together with the airbag, the mounting portions of the airbag located on predetermined positions of the cases cannot be placed on proper mounting positions and cannot be mounted on the vehicle body. Hence the airbag is prevented from being mounted on the body in a twisted state.

When the connecting member includes a bendable band member extending from at least either one of adjacent cases, a first engaging portion formed at a leading end of the band member, and a second engaging portion formed on another case and engageable with the first engaging member, and the first engaging portion and the second engaging portion are either a male engaging portion having a retaining leg or a female engaging portion having a retaining hole engageable with the retaining leg, respectively, the twist alarm means acting as the improper-assembly prevention means may be comprised of a detachment mechanism to dismount the retaining leg from the retaining hole when the connecting member is twisted along with twisting of the airbag between the cases. This configuration enables an assembly worker to perceive the twisting of the airbag by seeing the retaining leg detached from the retaining hole, so that the worker can straighten up the airbag for remounting on the vehicle.

The detachment mechanism may include a detachment alarm mechanism that warns the detachment of the retaining leg from the retaining hole by other condition than a configuration of the retaining leg from the retaining hole.

For example, such detachment alarm mechanism is comprised of making a hitting sound when the retaining leg hits a peripheral area of the retaining hole in coming off from the retaining hole. This arrangement enables an assembly worker to perceive the twisting of the airbag aurally as well as visually for eliminating twisting of the airbag.

The male engaging portion, for example, is designed to include a plate-shaped base plate and the retaining leg formed on the base plate and including a pair of symmetrical unciform members. Each of the unciform members includes a shank projecting perpendicularly from the base plate and a head that bulges from the leading end of the shank in a generally triangular shape as viewed from a direction orthogonal to an opposing direction of the shanks for engagement with the retaining hole.

In order to form the detachment alarm mechanism by the hitting sound, the shanks are coupled together by a thin plate-shaped rib for enhancing elastic deformation stress generated when the shanks are flexed close to each other. The enhanced stress helps enlarge the hitting sound when the retaining leg hits the peripheral area of the retaining hole in coming off from the retaining hole.

It will also be appreciated that at least one of butting planes of the male engaging portion and female engaging portion engaging with each other has a colored region that is colored by a color different from surroundings and that the detachment alarm mechanism is comprised of exposing the colored region upon detachment of the retaining leg from the retaining hole. The highly visible colored region will further help an assembly worker to perceive the twisting of the airbag visually in addition to by seeing the configuration of the retaining leg detached from the retaining hole, so that the airbag can be remounted in a straightened state.

Each of the cases desirably includes mounting flanges adapted to be fastened on the vehicle body together with the mounting portions of the airbag. This structure will facilitate the mounting of the cases on the vehicle together with the airbag.

BRIEF DESCRIPTION OF DRAWINGS

FIG. 3A illustrates a flattened airbag;

FIG. 3B shows a folded-up configuration of the airbag of FIG. 3A;

FIG. 14 depicts twist regulation means formed on a modification of the connecting member.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
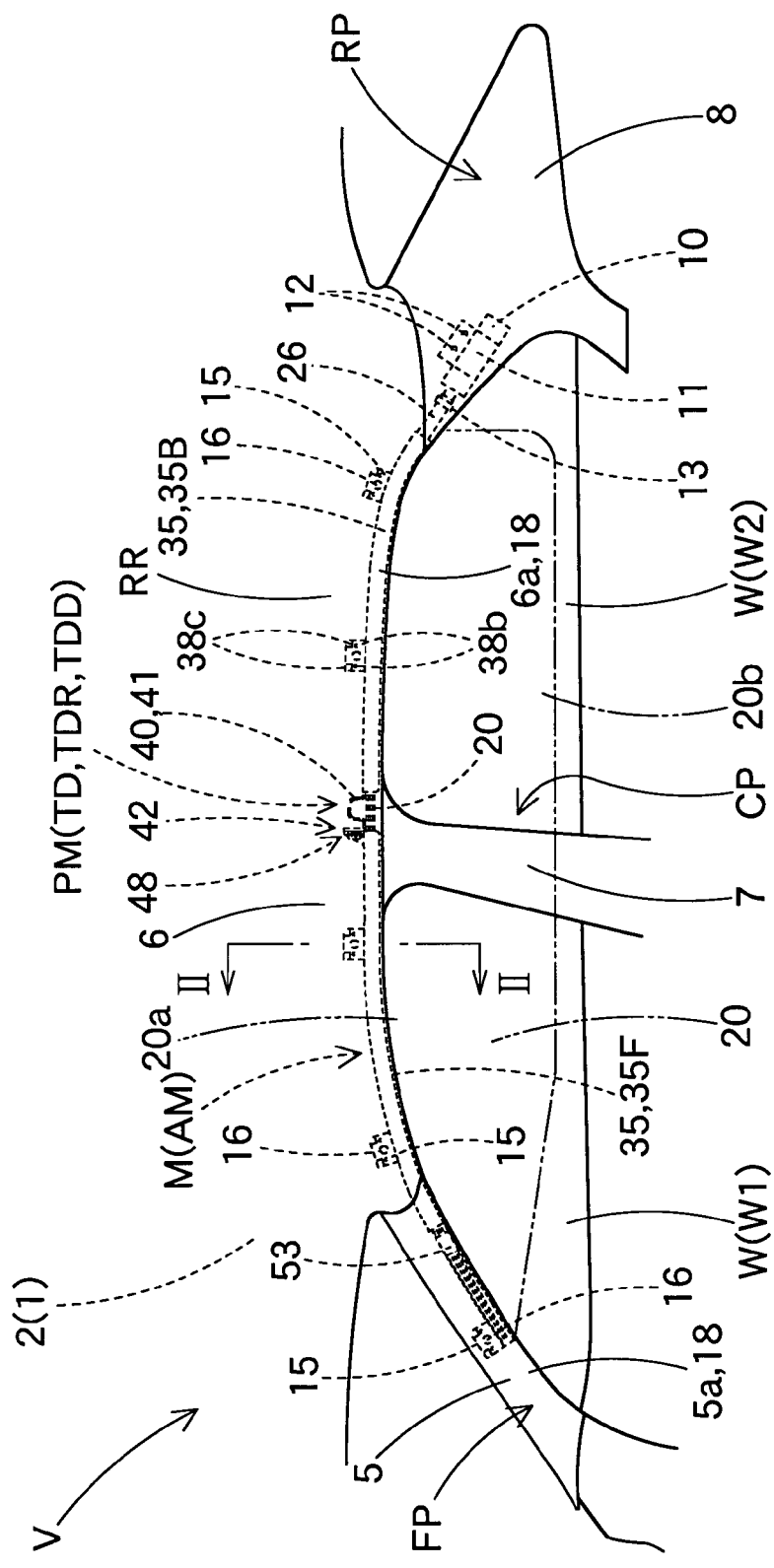
FIG. 1 illustrates a head-protecting airbag apparatus embodying the present invention mounted on a vehicle from the interior of a vehicle.

FIG. 1 illustrates a head-protecting airbag apparatus M embodying the present invention. An airbag 20 of the airbag apparatus M1 is folded up and stored on peripheries of upper rims of windows W (W1 and W2) of a vehicle V, i.e., in an area from a front pillar FP to a region above a rear pillar RP via a roof side rail RR so it covers the windows W1 and W2 upon deployment. The vehicle V includes a middle pillar CP disposed generally vertically between the front pillar FP and the rear pillar RP. The airbag 20 is designed to cover an inner side of a pillar garnish 7 of the middle pillar CP as well upon deployment.

As shown in FIG. 1, the head-protecting airbag apparatus M includes an airbag 20, an inflator 10 for supplying inflation gas to the airbag 20, mounting brackets 11 and 15, mounting bolts 12 and 16, and a case 35 (35F and 35B) for housing the airbag 20. When mounted on the vehicle V, interior sides of the airbag 20, the inflator 10 and the case 35 are covered by an airbag cover 18. In the illustrated embodiment, the airbag cover 18 is comprised of a lower region 5a of a front pillar garnish 5 covering the interior side of the front pillar FP and a lower region 6a of a roof head liner 6 covering the interior side of the roof side rail RR.

The front pillar garnish 5 and the roof head liner 6 are fabricated of synthetic resin, and are attached to the interior side of an inner panel 2 which is part of vehicle body structure 1 at locations of the front pillar FP and roof side rail RR by unillustrated mounting means. The middle pillar garnish 7 and the rear pillar garnish 8 are made from synthetic resin as well. As indicated by double-dashed lines in FIG. 2, the airbag cover 18 is designed to open inward of vehicle at the lower regions 5a and 6a of the front pillar garnish 5 and the roof head liner 6 when pushed by the airbag 20 and allows the airbag 20 to emerge therefrom.

As shown in FIGS. 1 and 3, the inflator 10 is formed into a generally columnar contour, and has unillustrated gas discharge ports at the leading end or front end. The inflator 10 is inserted into a joint port 26 of the airbag 20 at the region on the leading end including the gas discharge ports, and is joined with the airbag 20 using a clamp 13 mounted around the rear end of the joint port 26. Further, the inflator 10 is secured to the inner panel 2 by a mounting bracket 11 holding the inflator 10 and mounting bolts 12 for securing the bracket 11 to the inner panel 2.

As shown in FIGS. 3A and 3B, the airbag 20 is formed by hollow-weaving method of polyamide, polyester yarns or the like, and includes a gas admissive region 21 which is inflatable with inflation gas in such a manner as to separate an inner wall 21a and outer wall 21b, and a non-admissive region 28 which admits no inflation gas G. The inner wall 21a and outer wall 21b are connected to each other at the non-admissive region 28. The gas admissive region 21 includes a protection portion 22, a gas feed passage 25 and the joint port 26, whereas the non-admissive region 28 includes a peripheral portion 29, mounting portions 30, panel portions 31 and 32, and partitioning portions 33.

The protection portion 22 of the gas admissive region 21 includes a front protection portion 23 adapted to cover the window W1 disposed at a side of the front seat and a rear protection portion 24 adapted to cover the window W2 disposed at a side of the rear seat upon airbag deployment. The gas feed passage 25 extends forward from the joint port 26 along the upper rim 20a of the airbag 20 for delivering inflation gas G to the front and rear protection portions 23 and 24. The joint port 26 is disposed at the rear end of the upper rim 20a of the airbag 20 for introducing inflation gas G from the inflator 10 into the protection portion 22.

The front protection portion 23 and the rear protection portion 24 are divided by the panel portion 31, and each of the protection portions 23 and 24 are partitioned by the partitioning portions 33 into a plurality of cells 22a disposed side by side along the anteroposterior direction. This arrangement helps reduce the anteroposterior dimension, regulate the thickness and keep the panel shape extending along the anteroposterior direction, of the airbag 20 at inflation. Each of the cells 22a is arranged in a vertical rod shape and some are communicated with the gas feed passage 25. In this specific embodiment, the front protection portion 23 includes four cells 22a while the rear portion 24 includes three cells 22a.

The peripheral portion 29 of the non-admissive region 28 is located in outer periphery of the gas admissive region 21. The panel portion 31 has a substantially rectangular panel shape and is located between the front and rear protection portions 23 and 24 below the gas feed passage 25. The panel portion 31 is disposed at the front end of the airbag 20 and has a triangle panel shape. The panel portions 31 and 32 act to define an entire contour of the airbag 20, and to minimize the time period from the start to completion of inflation of the airbag 20 by reducing the volume of the airbag 20 as well. Some of the partitioning portions 33 have a generally T-shape, and some is formed into a fallen-down F-shape extending from the peripheral portion 29.

Figure 2:
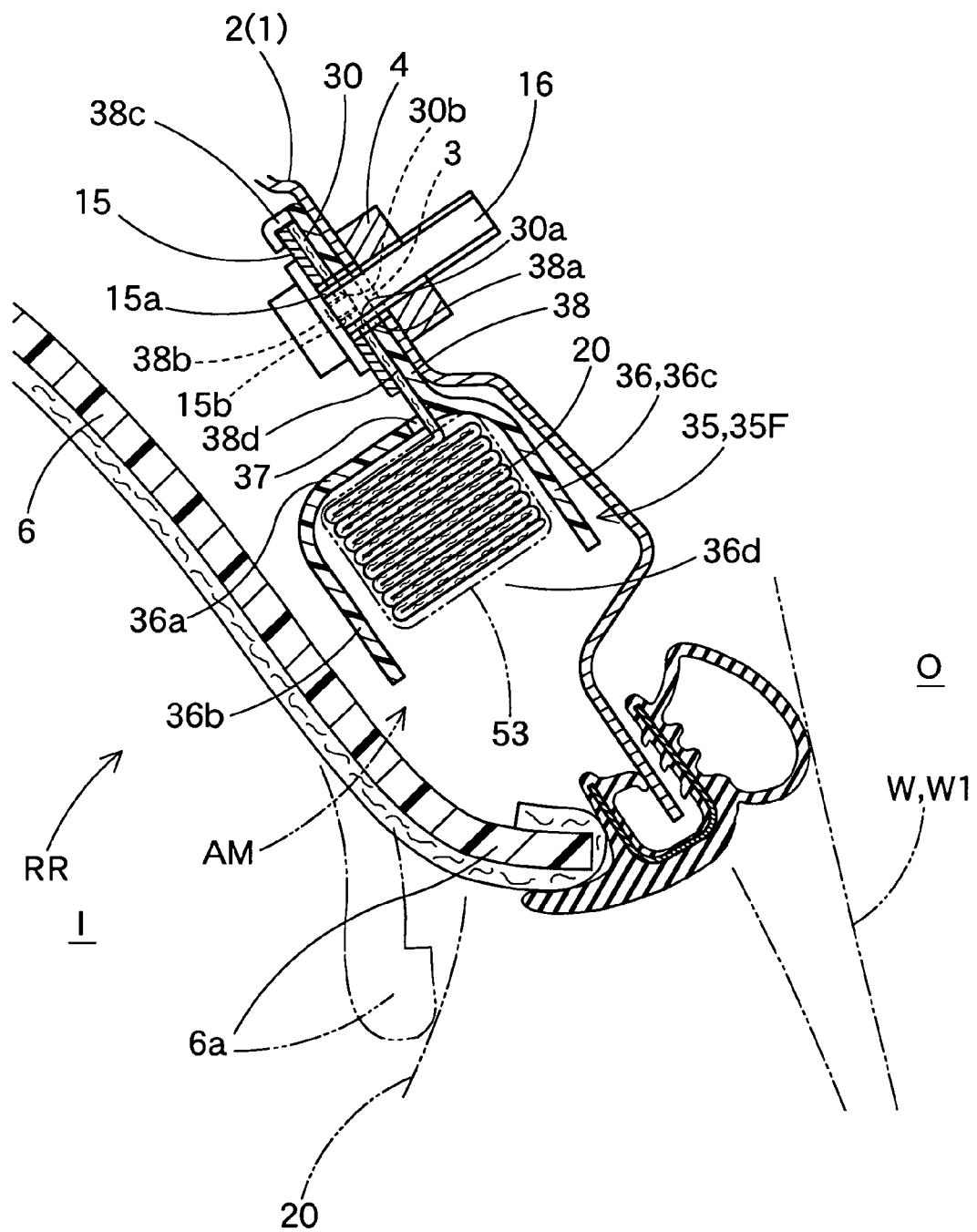
FIG. 2 is a schematic enlarged vertical section taken along line II-II in FIG. 1.

A plurality of mounting portions 30 are arranged to project upward from the upper rim 20a of the airbag 20 including the panel portion 32. Each of the mounting portions 30 includes an aperture 30a for receiving a mounting bolt 16 for attachment of the airbag 20 to the inner panel 2. A mounting bracket 15 acting as a support plate is attached to each of the mounting portions 30, and in that state, the mounting portions 30 are attached to the inner panel 2 as shown in FIG. 2, by the mounting bolts 16 put through the mounting holes 15a of the brackets 15 and apertures 30a. As shown in FIGS. 2 and 10, each of the mounting portions 30 and the mounting brackets 15 is provided around the aperture 30a/mounting hole 15a with two through holes 30b/15b for receiving later-described projections 38b formed on a mounting flange 38 of the case 35. The mounting bolts 16 are fastened with nuts 4 mounted on mounting holes 3 of the inner panel 2, thereby mounting the mounting portions 30, together with the mounting brackets 15 and the mounting flanges 38 of the case 35, on the inner panel 2 of the vehicle V.

Figure 4:
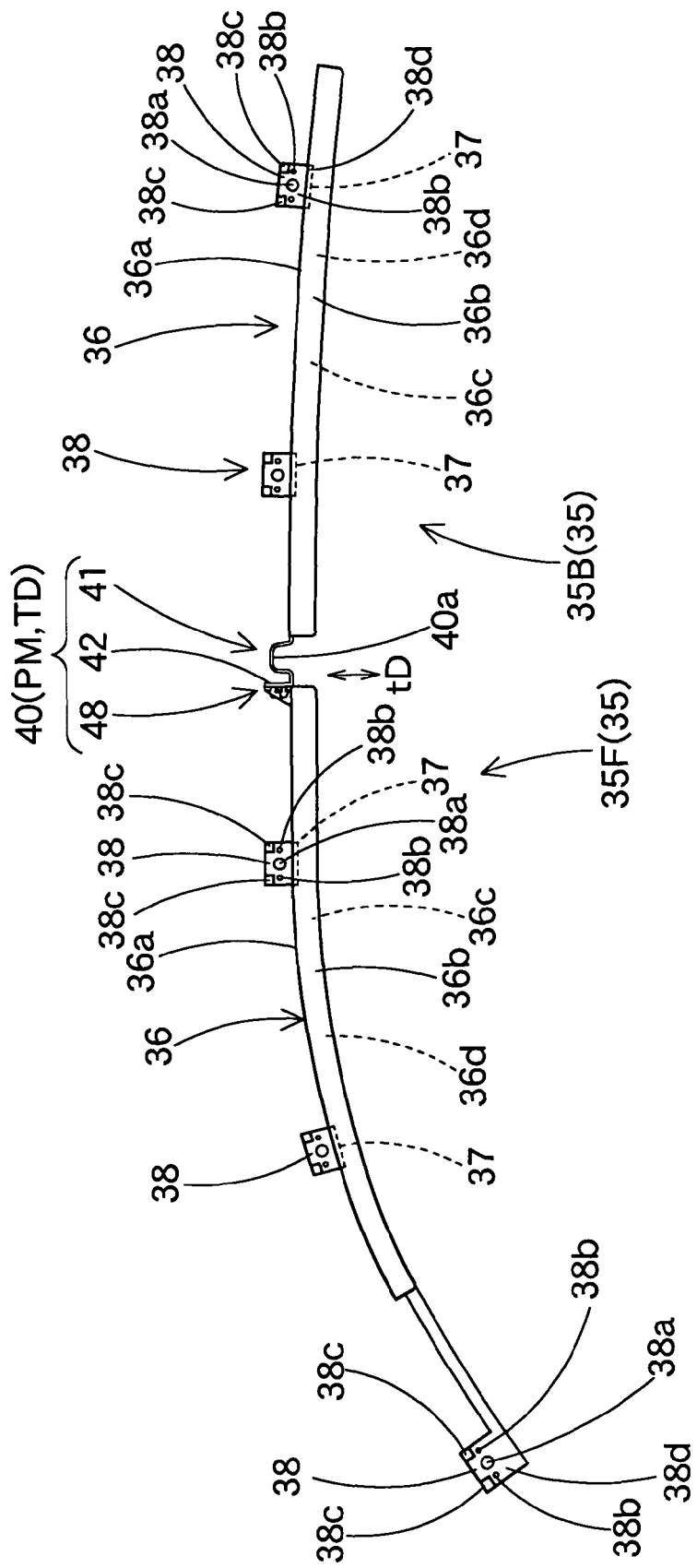
FIG. 4 is a front view of cases used for the airbag apparatus of FIG. 1.
Figure 6:
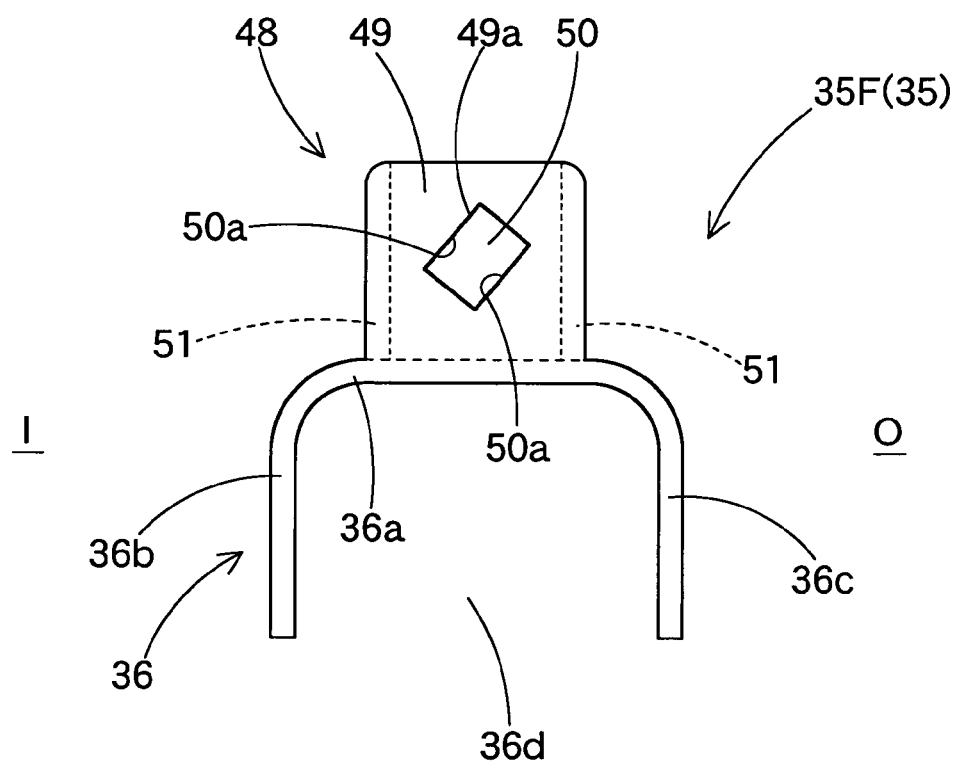
FIG. 6 is a side view of the vicinity of the female engaging portion of FIG. 5.
Figure 8:
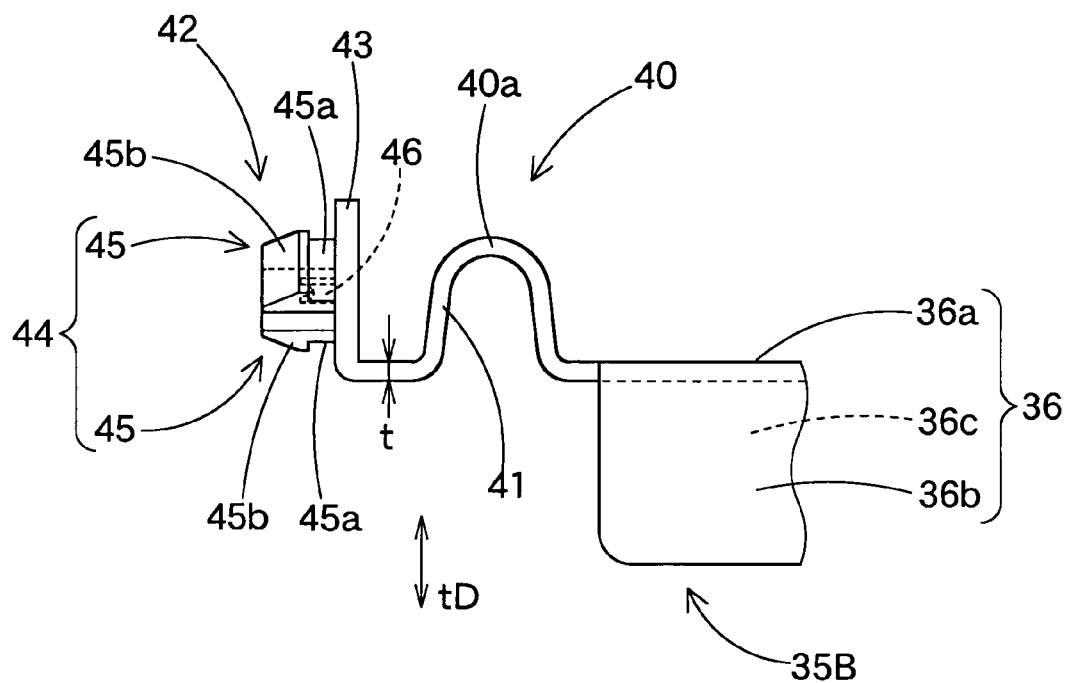
FIG. 8 is a partial front view of the vicinity of the male engaging potion of FIG. 7.
Figure 9:
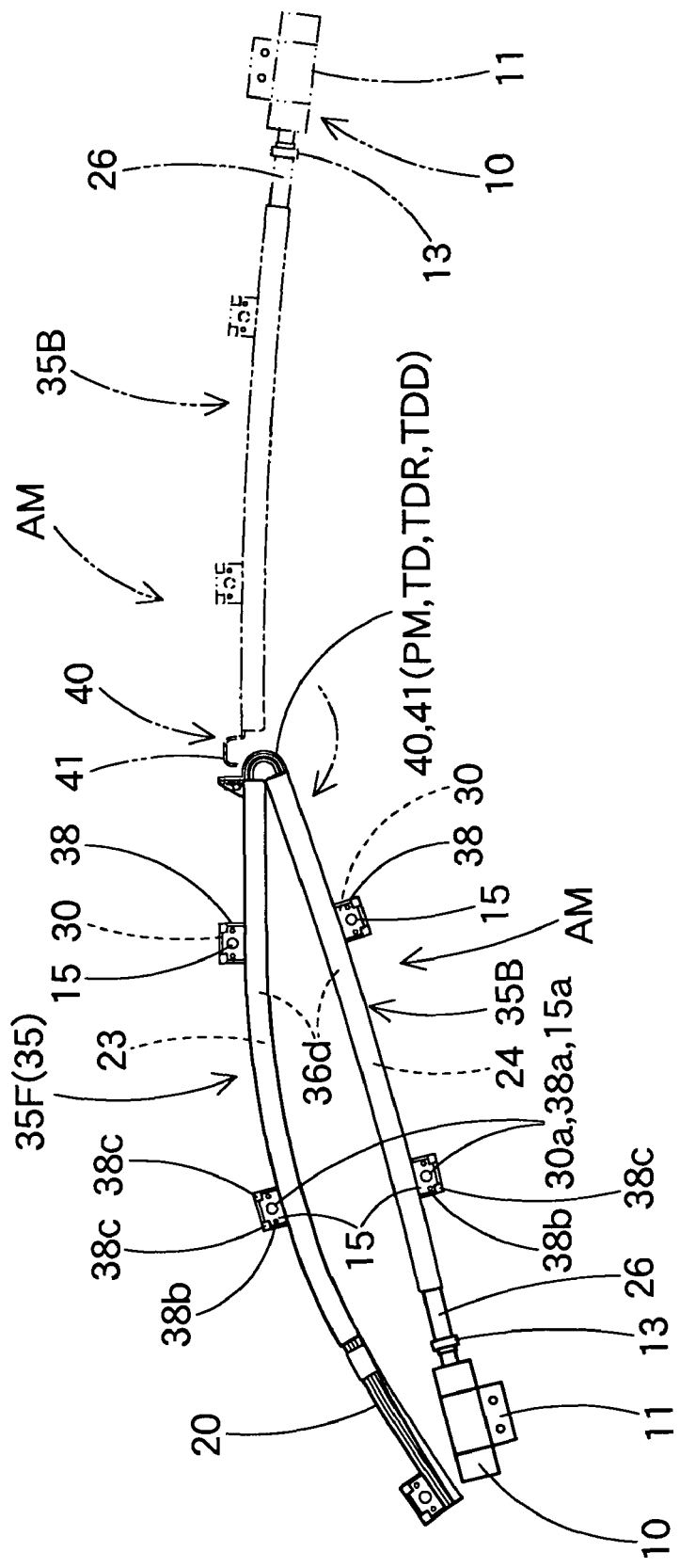
FIG. 9 illustrates an airbag module in a folded state.

The case 35 is arranged along the length direction of the folded-up airbag 20 as shown in FIG. 1. In this embodiment, as shown in FIGS. 4 and 9, the case 35 is comprised of two split parts, i.e., a case 35F housing the front protection portion 23 and a case 35B housing the rear protection portion 24, of the folded-up airbag 20. Each case 35 (35F, 35B) is fabricated of such synthetic resin as thermo-plastic elastomer of polyolefin, and includes a main body 36 having an inverse U-section for accommodating the folded-up airbag 20 as shown in FIGS. 2, 6 and 8. The main body 36 includes a ceiling wall 36a and side walls 36b and 36c extending downward from the inner and outer ends of the ceiling wall 36a. Each of the cases 35F and 35B is further provided with a plurality of mounting flanges 38 extending upward from the vicinity of the outer end of the ceiling wall 36a of the main body 36 (FIG. 2). The mounting flanges 38 are disposed on locations corresponding to the mounting portions 30 of the airbag 20. The ceiling wall 36a is provided at locations in the vicinity of and at the inner side I of the mounting flanges 38 with slots 37 for receiving the mounting portions 30 from lower side. The front end region of the front case 35F is comprised of only the side wall 36c and mounting flanges 38, without the ceiling wall 36a or the side wall 36b, since the panel portion 32 arranged at this region has a small volume of cloth material.

As shown in FIGS. 2 and 4, each of the mounting flanges 38 includes an aperture 38a for receiving the mounting bolt 16 according to the mounting portion 30 and the mounting bracket 15, and two columnar projections 38b projecting toward the inside I in a columnar manner from the front and rear of the aperture 38a. On the front and rear upper corners of the mounting flange 38 are holding strips 38c that project toward the inside I and then bend downward so as to have a L-shaped section. When the folded-up airbag 20 is stored inside the main body 36, the mounting portions 30 of the airbag 20 are placed on inner surfaces 38d of the flanges 38 through the slots 37. At this time, the projections 38b are put through the through holes 30b of each of the mounting portions 30 (FIG. 2). If then the mounting brackets 15 are placed in abutting contact with the inner side of the mounting portions 30 so the brackets 15 are caught by the holding strips 38c and the projections 38b are put through the through holes 15b, the mounting portions 30 are attached to the mounting flanges 38 of the case 35 in a clamped manner between the brackets 15 and flanges 38.

As shown in FIG. 4, a connecting member 40 is located between the front and rear cases 35F and 35B to connect the cases 35F and 35B and includes a bendable band member 41. The connecting member 40 permits one of the cases 35 to be bent downward along the thickness direction tD (FIG. 8) of the band member 41, in other words toward the direction the inverse U-shaped section of the case 35 open, relative to the other case 35. The connecting member 40 is provided with improper-assembly prevention means PM for preventing the airbag 20 from being mounted on the vehicle body 1 in a twisted state between the cases 35F and 35B.

Referring to FIGS. 5-8, 10A and 10B, more specifically, the connecting member 40 of this embodiment includes a band member 41 extending from at least either one of adjacent cases (35B, in this embodiment), a first engaging portion 42 formed at a leading end of the band member 41 and a second engaging portion 48 formed on another case (35F, in this embodiment) to be engageable with the first engaging portion 42. In this specific embodiment, the band member 41 extends forward from the front end of the ceiling wall 36a of the rear case 35B and is bent in an inverse U-shape as viewed from the interior, and has a male engaging portion 42 acting as the first engaging portion at the front end. The band member 41 is formed into a band shape whose sectional shape taken along the in-out direction of vehicle is a rectangle whose longer side is arranged along the in-out direction so as to be bendable downward (i.e., toward the direction where an opening 36d of the case 35 is disposed) as shown in FIG. 9. The male engaging portion 42 has a retaining leg 44. The second engaging portion 48 is a female engaging portion 48 formed on a rear end area of the ceiling wall 36a of the front case 35F and includes a retaining hole 50 engageable with the retaining leg 44.

In this embodiment, the improper-assembly prevention means PM is comprised of twist alarm means TD for annunciating of occurrence of twisting of the connecting member 40 by designing the connecting member 40, especially the band member 41 in this embodiment, to be twisted along with twisting of the airbag 20. The connecting member 40 including the band member 41 is made from unextensible synthetic resin material. This construction constitutes a distance shortening mechanism TDR to shorten a distance SL between the connected cases 35F and 35B at twisting the connecting member 40, and this mechanism TDR also constitutes the twist alarm means TD.

In this embodiment, furthermore, the connecting member 40 includes a detachment mechanism TDD, as the another twist alarm means TD, to detach the retaining leg 44 from the retaining hole 50 when the band member 41 is twisted along with twisting of the airbag 20 between the cases 35F and 35B (FIGS. 11A-11D).

Figure 5:
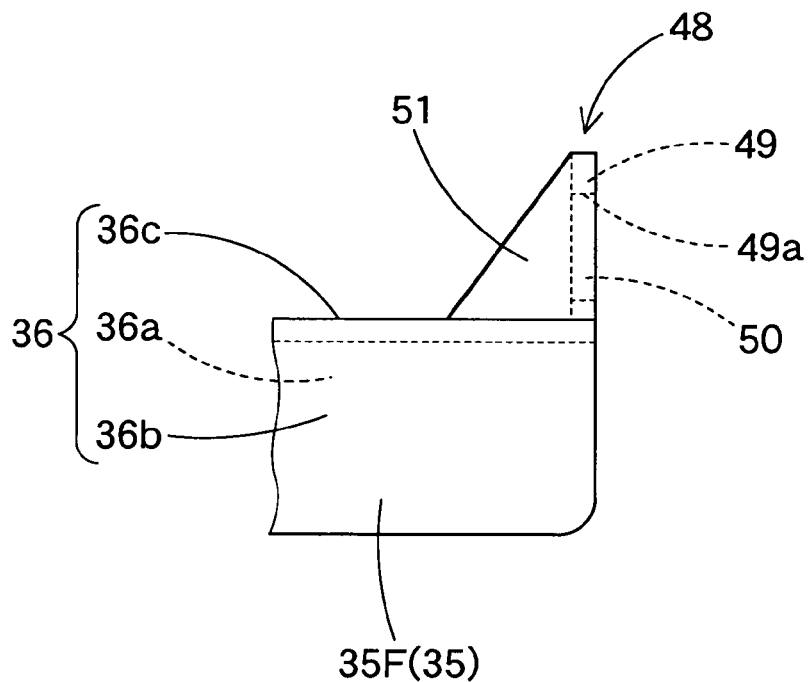
FIG. 5 is a partial front view of the vicinity of a female engaging portion used for the case of FIG. 4.

As shown in FIGS. 5 and 6, the female engaging portion 48 of this embodiment is formed of a base plate 49 extending upward in a generally rectangular plate shape from the topside of the rear end of the ceiling wall 36a of the case 35F. The base plate 49 has a rectangular retaining hole 50 running through the plate 49 in the anteroposterior direction. At the inside and outside edges of the base plate 49 are ribs 51 for reinforcement each having rectangular plate shape and coupled to the ceiling wall 36a. In this embodiment, the retaining hole 50 is arranged so that its longer side 50a extends about 45 degree diagonal to the orientations of the ribs 51 (i.e., the vertical direction, in this embodiment, see FIG. 6).

Figure 7:
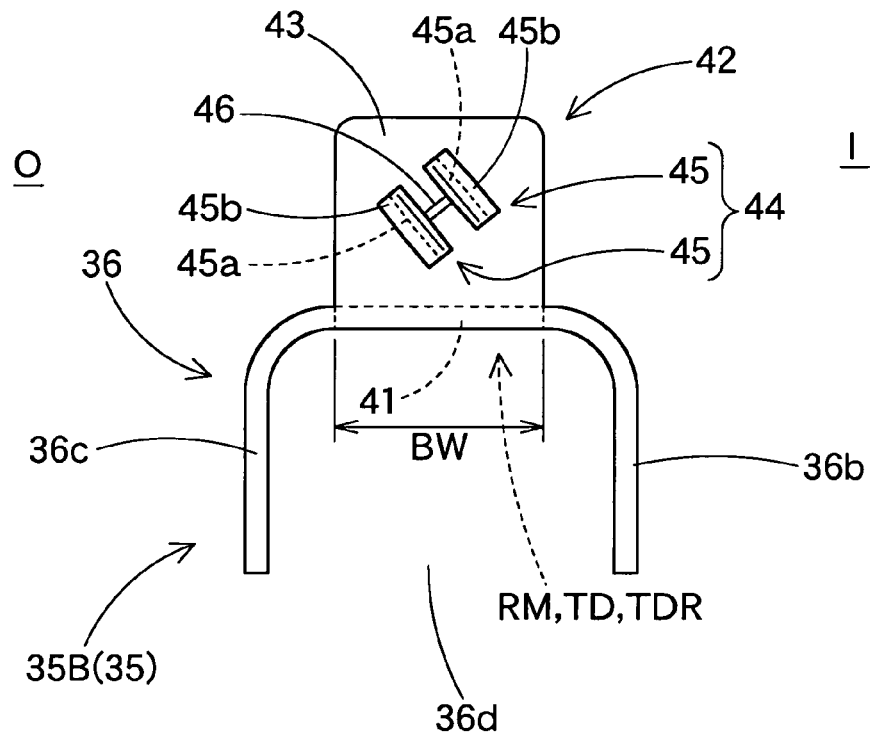
FIG. 7 is a side view of the vicinity of a male engaging portion used for the case of FIG. 4.

As shown in FIGS. 7 and 8, the male engaging portion 42 includes a base plate 43 extending upward in a generally rectangular plate shape from the front end of the band member 41 and a retaining leg 44 projecting forward from the front side of the base plate 43. The retaining leg 44 is comprised of a pair of symmetrical unciform members 45. Each of the unciform members 45 includes a square columnar shank 45a projecting perpendicularly from the base plate 43 and a head 45b formed at the leading end of the shank 45a. As shown in FIGS. 12A to 12D, each of the heads 45b forms a generally triangle bulging from the shank 45a as viewed from a direction orthogonal to the opposing direction of the shanks 45a. The shanks 45a are coupled to each other at the root areas by a rib 46 having a thin plate shape as shown in FIGS. 7 and 12A to 12D so as to enhance stress generated when the shanks 45a are flexed close to each other.

Although the band member 41 is so deformable that a region 40a bent in an inverse U-shape can be straightened, its thickness t (FIGS. 8 and 10A) is so determined as not to allow stretching anywhere other than the bent portion 40a.

Figure 11A:
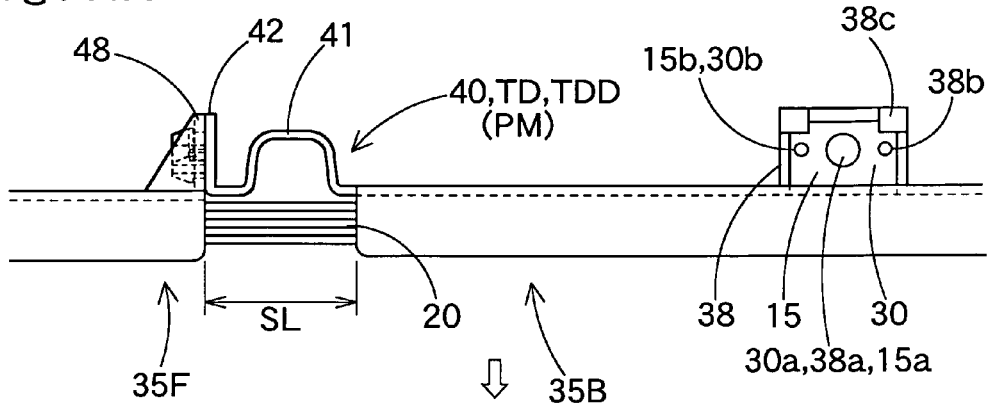
FIGS. 11A, 11B, 11C and 11D illustrate the operation of a detachment mechanism formed on the connecting member in order.
Figure 11B:
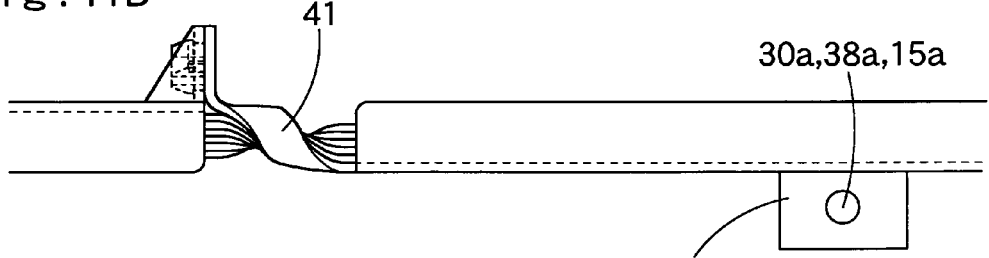
Figure 11C:
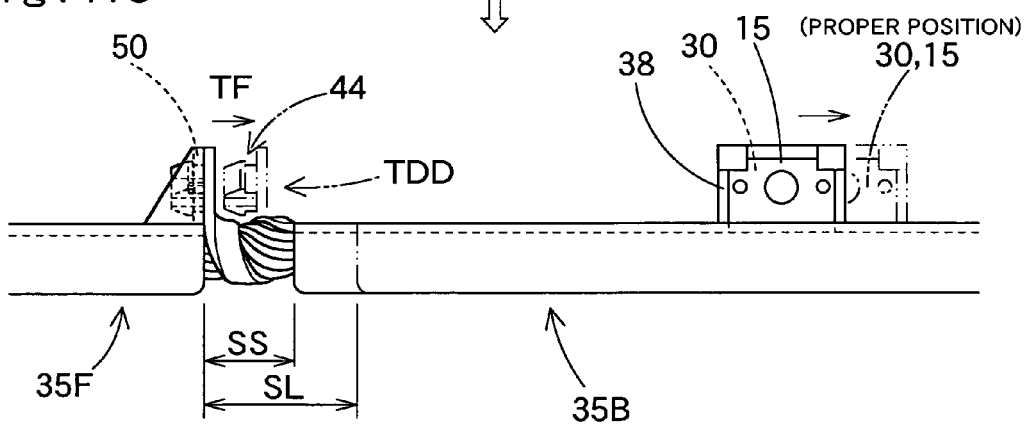
Figure 11D:
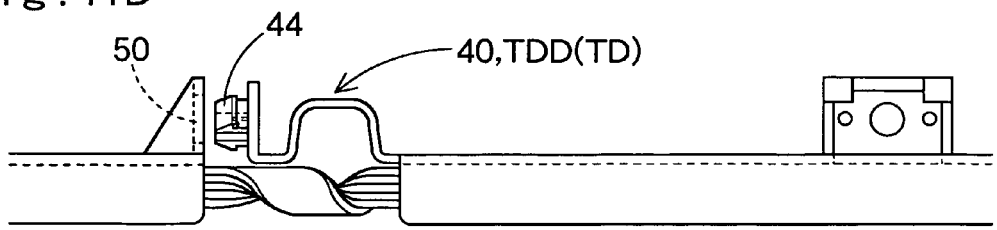

The engaging force of the retaining leg 44 against the retaining hole 50 is designed such that, when the cases 35F and 35B are rotated 360 degree relative to each other about the axis which is anteroposteriorly oriented so that the distance SL between the cases 35F and 35B is shortened to the short distance SS as shown in FIGS. 11A to 11C, the retaining leg 44 comes off from the retaining hole 50 due to a tensile force to return the distance SS to the original distance SL as shown in FIGS. 11C and 11D so that the mounting portions 30 are returned to appropriate positions. This mechanism, namely detaching mechanism TDD for dismounting the retaining leg 44 from the retaining hole 50 constitutes part of the twist alarm means TD.

In this embodiment, moreover, the rib 46 coupling the unciform members 45 of the retaining leg 44 together enhances the stress generated when the unciform members 45 are flexed close to each other. Hence the retaining leg 44 makes a sound when the leg 44 comes off from the retaining hole 50 and the heads 45b hit against an inner surface 49a of the hole 50 as indicated by double-dashed lines and solid lines in FIG. 12C. Accordingly, the detachment of the retaining leg 44 from the retaining hole 50 is known to an assembly worker visually and aurally. That is, the detaching mechanism TDD to dismount the retaining leg 44 from the retaining hole 50 includes a detachment alarm mechanism IM for warning the detachment by other condition than a configuration of the retaining leg 44 from the retaining hole 50 and which mechanism IM includes a mechanism to make a hitting sound when the heads 45b hit the inner surface 49a of the retaining hole 50.

To describe how to mount the head-protecting airbag apparatus M on the vehicle V schematically, the airbag 20 is folded up firstly. As shown in FIG. 3A, the airbag 20 is folded up from flattened and deflated state in a bellows fashion, i.e. in such a manner as to fold up the airbag 20 on creases C parallel to the upper edge 20a and pile it up generally vertically so that the lower edge 20b is brought close to the upper edge 20a. Thereafter, a breakable wrapping member 53 is wound around the folded-up airbag 20 as shown in FIG. 3B. Subsequently, the front protection portion 23 of the airbag 20 is stored in the main body 36 of the case 35F whereas the rear protection portion 24 is stored in the main body 36 of the case 35B, and the mounting portions 30 are passed through the slots 37 and placed on the inner surfaces 38d of the mounting flanges 38. At this time, the projections 38b are put through the through holes 30b of the mounting portions 30 (FIG. 2). Then the mounting brackets 15 are placed in abutting contact with the inner sides of the mounting portions 30 so the brackets 15 are caught by the holding strips 38c and the projections 38b are put through the through holes 15b. Thus the mounting portions 30 are attached to the mounting flanges 38 of the cases 35F and 35B in a clamped manner between the brackets 15 and flanges 38. Then the inflator 10 with the mounting bracket 11 mounted thereon is inserted into and joined with the joint port 26 by the clamp 13, thereby forming an airbag module AM as shown in FIG. 9.

If the airbag module AM is bent at the band member 41 of the connecting member 40 as indicated by double-dashed lines to solid lines in FIG. 9, the airbag module AM is formed into a compact configuration. Putting the module AM in a canister or a bag for transportation will make it even easier to store and transport the module AM until it is mounted on the vehicle V.

In mounting the airbag apparatus M on the vehicle V, the airbag module AM is straightened. If then the mounting brackets 11 and 15 are disposed on predetermined locations of the inner panel 2 and fastened with bolts 12 and 16, the airbag module AM is assembled with the vehicle V. Thereafter, an unillustrated wire extending from a control device for the inflator 10 is connected to the inflator 10, and the front pillar garnish 5, the roof head lining 6, the middle pillar garnish 7 and the rear pillar garnish 8 are attached to the inner panel 2. Thus the head-protecting airbag apparatus M is mounted on the vehicle V.

When the airbag apparatus M is actuated after being mounted on the vehicle V to activate the inflator 10 to supply inflation gas G to the airbag 20, inflation gas G flows into the gas feed passage 25 and then into the cells 22a. The airbag 20 then pushes and opens the airbag cover 18 and deploys downward to cover the interior sides of the windows W1, W2 and the middle pillar CP as indicated by double-dashed lines in FIG. 1.

In the airbag apparatus M embodying the present invention, the improper-assembly prevention means PM formed on the connecting member 40 prevents the airbag 20 from being mounted on the vehicle V in a twisted state when the airbag module AM is unfolded for assembly with the vehicle V at the mounting portions 30.

Figure 10A:
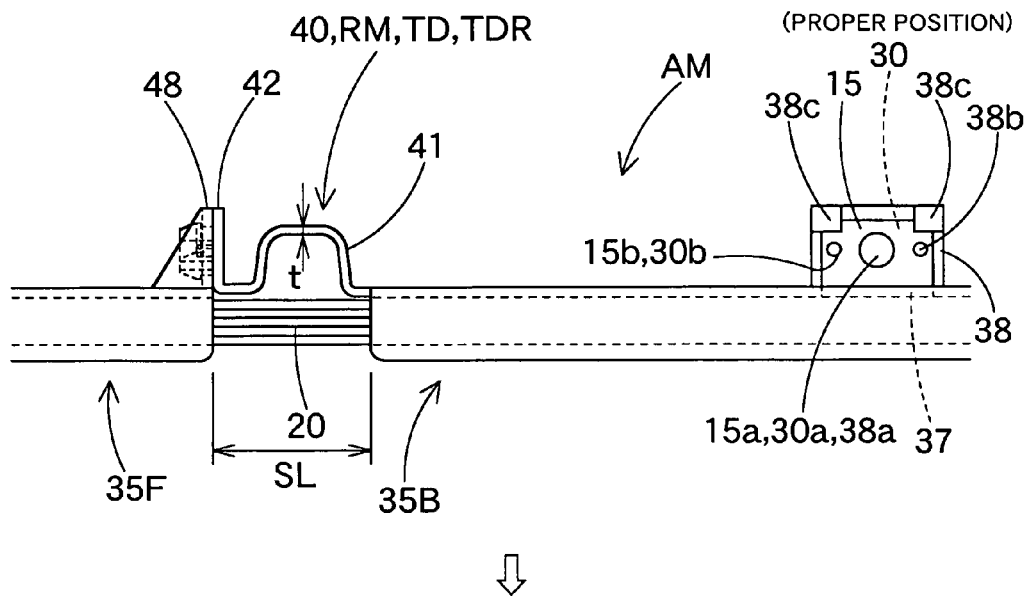
FIGS. 10A and 10B illustrate the operation of a distance shortening mechanism formed on a connecting member in order.
Figure 10B:
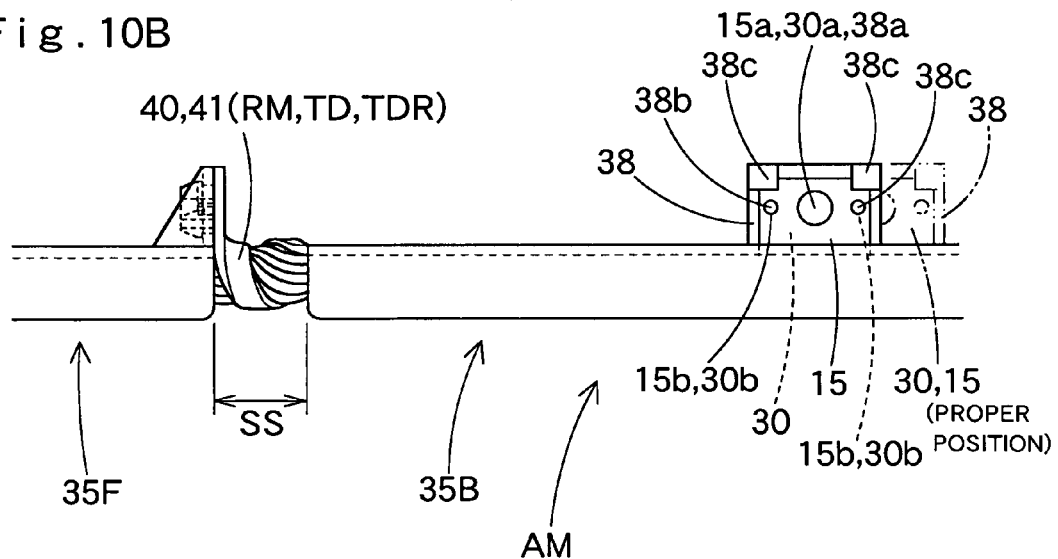

Specifically, the airbag apparatus M includes, as the improper-assembly prevention means PM, the twist alarm means TD for annunciating of occurrence of twisting of the airbag 20 by designing the band member 41 of the connecting member 40 twistable along with twisting of the airbag 20 between the cases 35F and 35B. More specifically, the twist alarm means TD is comprised of the distance shortening mechanism TDR where the band member 41 of the connecting member 40 made from predetermined unextensible material and having predetermined thickness t shortens the distance between the cases 35F and 35B when the band member 41 is twisted (FIGS. 10A and 10B). If the distance SL shown in FIG. 10A is shortened to the short distance SS when the band member 41 is twisted along with the airbag 20 after the case 35F is mounted on the vehicle body 1, the mounting portions 30 and mounting brackets 15 on the part of the case 35B are pulled forward and cannot be placed on proper positions, so that the brackets 15 cannot be mounted on the vehicle body 1 since the mounting bolts 16 cannot be inserted into the mounting holes 3 of the inner panel 2 through the mounting holes 15a and apertures 30a. Therefore, the airbag 20 is prevented from being mounted on the body 20 in a twisted state.

Needless to say, since the connecting member 41 is bendable, the airbag apparatus M is bendable between the cases 35F and 35B with the airbag 20 stored in the cases 35F and 35B as shown in FIG. 9, which is convenient for transportation.

Therefore, the airbag apparatus M is capable of preventing the airbag 20 from being mounted on a vehicle in an improper manner by the improper-assembly prevention means PM though the airbag 20 is stored in more than one cases 35F and 35B and bent during transportation.

Moreover, the connecting member 40 includes the detachment mechanism TDD, as the twist alarm means TD constituting the improper-assembly prevention means PM, where the retaining leg 44 is designed to be detached from the retaining hole 50 when the connecting member 40 is twisted along with twisting of the airbag 20 between the cases 35F and 35B. Specifically, if the cases 35F and 35B are rotated 360 degree relative to each other about the axis oriented anteroposteriorly after the case 35F is mounted on the vehicle body 1, the distance SL between the cases 35F and 35B is shortened to the short distance SS as shown in FIGS. 11A to 11C. Then the mounting portions 30 and mounting brackets 15 on the part of the case 35B are pulled forward and cannot be placed on the proper positions, where is exerted a tensile force TF as indicated by double-dashed lines in FIG. 11C that returns the distance SS to the original distance SL and locate the mounting portions 30 and mounting brackets 15 on the proper positions, which dismount the retaining leg 44 from the retaining hole 50. The dismounting of the retaining leg 44 from the retaining hole 50 is visible to an assembly worker as shown in FIG. 11D and annunciates the worker of the twisting of the airbag 20, thereby the detachment mechanism TDD constitutes the twist alarm means TD. Hence the worker can straighten the airbag 20 for assembly on the vehicle.

With respect to the distance shortening mechanism TDR, when the distance SL between the cases 35F and 35B is shortened to the short distance SS along with the twisting of the connecting member 40, if the width BW of the band member 41 (FIG. 7) is small, the distance SS becomes great since the shrinkage by twisting is small. On the other hand, if the width BW is great, the distance SS becomes small since the shrinkage is great. Although the airbag 20 is twisted when the cases 35F and 35B are twisted relatively to each other, the twisting of the airbag 20 itself does not affect the variation in the distance SS between the cases 35F and 35B so much because the twisting of the airbag 20 occurs in a long span between the mounting portions 30 located immediately in front and in the rear of the connecting member 40. Therefore, the width BW can be adequately designed in a range of 10-30 mm for adjustment of the distance SS while considering the bendable thickness t as well. In this embodiment, the thickness t is set at 0.8 mm which is in a desirable range of 0.5-1.5 mm in consideration of breaking strength and bending strength. The width BW is set at 20 mm.

Setting the width BW of the band member 41 wide in order to reduce the short distance SS increases the load on the band member 41 at twisting the cases 35F and 35B 360 degree relatively to each other. On the other hand, the anteroposterior length of the airbag 20 is not shortened so much even if twisted 360 degree in the vicinity of the connecting member 40. That is, when the distance SS between the cases 35F and 35B is shortened, the airbag 20 exerts a counter-pressure against the shortening force on the base plates 43 and 49 in such a manner as to separate the plates 43 and 49, thereby helping dismount the retaining leg 44 from the retaining hole 50. That is, the detachment mechanism TDD can be comprised of the band member 41 itself having a predetermined width BW.

Figure 12A:
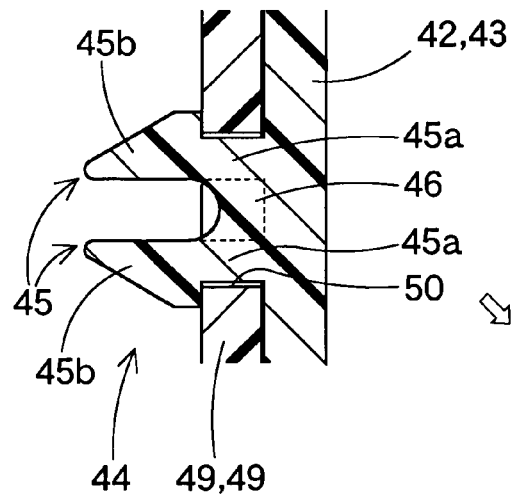
FIGS. 12A, 12B, 12C and 12D illustrate the operation of a detachment alarm mechanism formed on the connecting member in order.
Figure 12B:
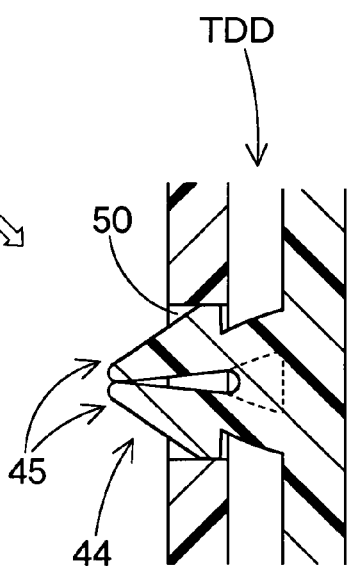
Figure 12C:
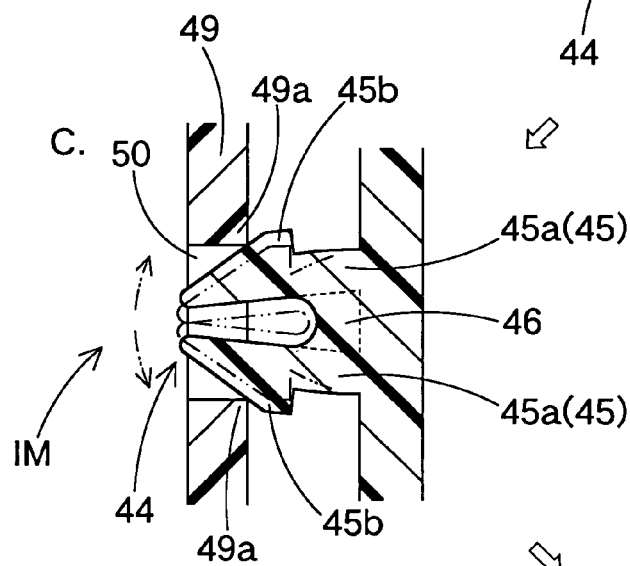
Figure 12D:
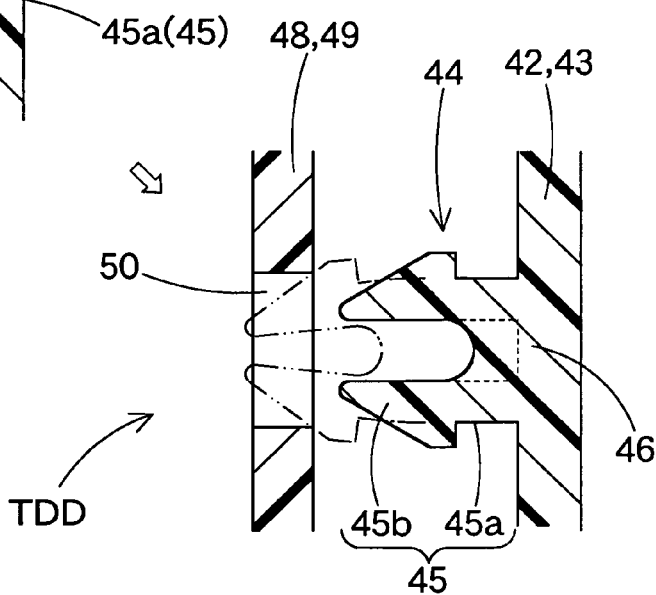

Furthermore, the detachment mechanism TDD of this embodiment includes the detachment alarm mechanism IM that warns the detachment of the retaining leg 44 from the retaining hole 50 by making a hitting sound. Specifically, when the retaining leg 44 comes off from the retaining hole 50 as shown in FIGS. 12A and 12B, the unciform members 45 are flexed close to each other. Then the retaining leg 44 makes a sound when the heads 45b of the unciform members 45 come off from the retaining hole 50 and the heads 45b hit against the inner surface 49a of the retaining hole 50 as indicated by double-dashed lines and solid lines in FIG. 12C. Especially in this embodiment, since the shanks 45a are coupled to each other by the rib 46 so as to enhance stress generated when the shanks 45a are flexed close to each other, a huge sound is made when the heads 45b hit against the inner surface 49a of the retaining hole 50. This sound enables an assembly worker to perceive the twisting of the airbag 20 aurally as well as visually by seeing the retaining leg 44 detached from the retaining hole 50, so that the worker can straighten the airbag 20 for remounting.

Figure 13A:
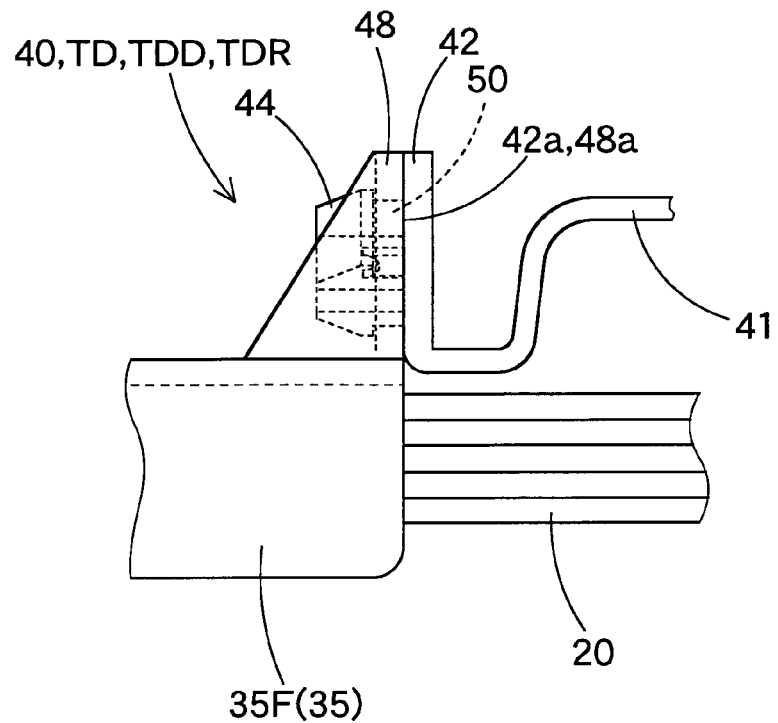
FIGS. 13A and 13B illustrate the operation of a detachment alarm mechanism of an alternative embodiment.
Figure 13B:
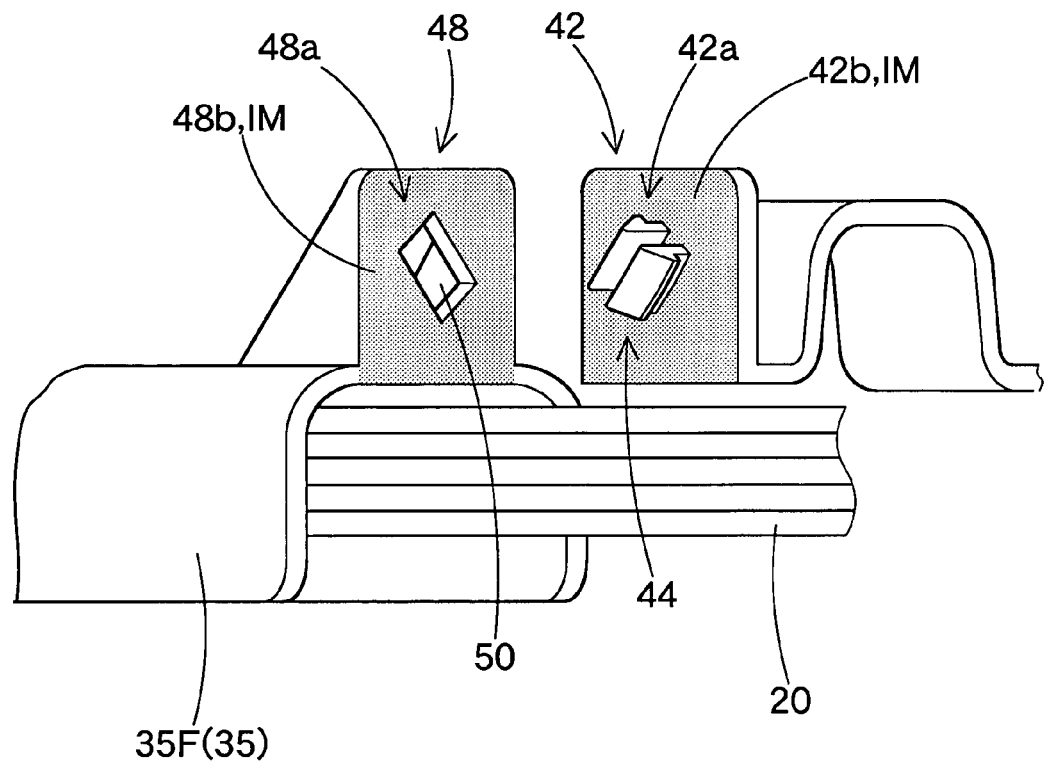

The detachment alarm mechanism IM may be alternatively configured as shown in FIGS. 13A and 13B by forming a region 42b/48b that is colored by a color different from the surrounding on at least one of butting planes 42a and 48a of the male engaging portion 42 and female engaging portion 48 so that the colored region 42b/48b is exposed on detachment of the retaining leg 44 from the retaining hole 50. The highly visible colored region 42b/48b further helps an assembly worker to perceive the twisting visually in addition to by seeing the configuration of the retaining leg 44 detached from the retaining hole 50 and prompts the worker to remount the airbag 20 in a straightened state. In the illustrated embodiment, opposing planes of the base plates 43 and 49 of the male engaging portion 42 and female engaging portion 48 acting as butting planes 43a and 49a have colored regions 43b and 49b that are colored by yellow which is highly visible in comparison with black of surroundings. The butting plane with the colored region may be formed on only one of the male engaging portion 42 or female engaging portion 48.

Figure 15:
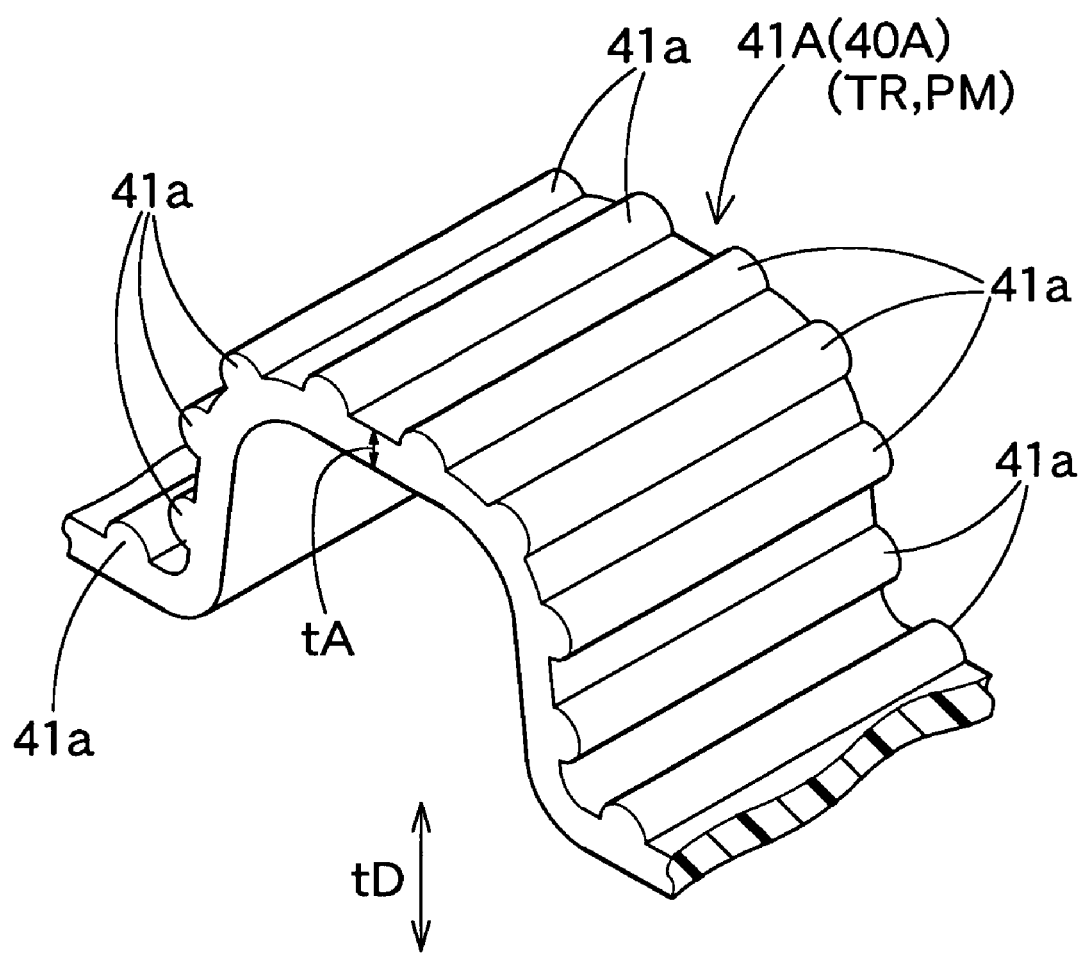
FIG. 15 is a partial enlarged perspective view of a band member of the connecting member of FIG. 14.

The improper-assembly prevention means PM may alternatively be comprised of twist regulation means TR formed on a connecting member 40A as shown in FIGS. 14 and 15. The twist regulation means TR prevents the connecting member 40A from twisting to a 360-degree roll about the axis of the cases 35F and 35B oriented anteroposteriorly, thereby preventing the airbag 20 from being twisted between the cases 35F and 35R. In the illustrated embodiment, the twist regulation means TR is formed by thinning the thickness tA of a band member 41A of the connecting member 40A so as to permit bending of the connecting member 41A, and by disposing a plurality of ribs 41a extending orthogonal to a connecting direction of the cases 35F and 35B on the band member 41A side by side along the connecting direction. This configuration makes the band member 41A of the connecting member 40A bendable but untwistable. The twist regulation means TR is sufficient if the airbag 20 cannot twist into a 360-degree roll about the axis of the cases 35F and 35B arranged anteroposteriorly between the cases 35F and 35B, i.e., it is sufficient if the mounting portions 30 of the airbag 20 are attached to the vehicle body 1 in a 360-degree twisted state. To the contrary, it is not preferable if the connecting member 40A is given such a rigidity as not to allow twisting at all, because bending along the thickness direction tD (FIG. 14) is not assured.

The twist regulation means TR can be formed without such ribs 41a as described above, but may be formed by reducing ease of twisting of the connecting member to such a degree as to permit bending, for example by increasing the width BW and thickness t of the connecting member 40 shown in FIGS. 7 and 8.

With the connecting member 40A having the twist regulation means TR, the connecting member 40A is formed only of the band member 41A but without the male engaging portion 42 with the retaining leg 44 and the female engaging portion 48 with the retaining hole 50 so that the cases 35F and 35B are coupled to each other only by the band member 41A. The cases 35F, 35B and the band member 41A may be formed integral. This configuration also makes the airbag apparatus M foldable between the cases 35F and 35B with the airbag 20 stored in the cases 35F and 35B by bending the band member 41A along the thickness direction tD, which is convenient for transportation.

Moreover, the connecting member 40 may be formed only of the band member 41 integral with the case 35F and 35B so only the band member 41 connect the cases 35F and 35B also when the improper-assembly prevention means PM is comprised of the twist alarm means TD formed only of the distance shortening mechanism TDR. This configuration also makes the airbag apparatus M foldable between the cases 35F and 35B with the airbag 20 stored in the cases 35F and 35B by bending the band member 41 along the thickness direction tD, which is convenient for transportation.

In the foregoing embodiments, the airbag apparatus M is bent between the cases 35F and 35B along the thickness direction tD of the band member 41 so that the openings 36d of the main bodies 36 of the case 35F and 35B approach each other as shown in FIG. 9. However, the airbag apparatus M may be bent toward the opposite direction in the thickness direction tD for transportation.

Although the band member 41/41A has been described as mounted on the ceiling wall 36a of the cases 35F and 35B, it may be formed on the side wall 36b or 36c so the band member 41/41A is bendable along the thickness direction tD thereof.

Although the band member 41 is connected only with the male engaging portion 42, the band member 41 or 41A may be arranged to connect the female engaging portion 48 and the case 35F, or both between the male engaging portion 42 and the case 35B and between the female engaging portion 48 and the case 35F.

Furthermore, three or more cases 35 may be used to house the airbag 20 with the band members 40 between adjacent cases.

What is claimed is:

1. A head-protecting airbag apparatus adapted to be mounted on a vehicle, comprising:
   an airbag folded up in an elongative contour for covering a window of vehicle upon deployment, the airbag including a plurality of mounting portions at which the airbag is mounted on a vehicle body along an upper periphery of the window;
   a plurality of cases made from synthetic resin and arranged along the length direction of the folded-up airbag for housing the airbag and being mounted on the vehicle body together with the airbag; and
   a bendable connecting member connecting one of the cases to another whereby permitting the airbag stored in the cases to be transported in a bent state at the connecting member before being mounted on the vehicle, the connecting member including improper-assembly prevention means for preventing the airbag from being attached to the vehicle body in a twisted state between the cases at assembly on the vehicle.

2. The head-protecting airbag apparatus according to claim 1, wherein the improper-assembly prevention means is twist regulation means for preventing the connecting member from being twisted.

3. The head-protecting airbag apparatus according to claim 2, wherein:
   the connecting member includes a band member of which sectional contour taken along a direction orthogonal to a connecting direction of the cases is a rectangle; and
   the twist regulation means is comprised of disposing a plurality of ribs extending orthogonal to the connecting direction on the band member side by side along the connecting direction.

4. The head-protecting airbag apparatus according to claim 1, wherein the improper-assembly prevention means is comprised of twist alarm means for annunciating of occurrence of twisting of the connecting member by designing the connecting member to be twisted along with twisting of the airbag between the cases.

5. The head-protecting airbag apparatus according to claim 4, wherein the twist alarm means is comprised of a distance shortening mechanism that shortens a distance between the connected cases when the connecting member is twisted by making the connecting member from an unextensible material.

6. The head-protecting airbag apparatus according to claim 4, wherein:
   the connecting member includes:
   a bendable band member extending from at least either one of adjacent cases;
   a first engaging portion formed at a leading end of the band member; and
   a second engaging portion directly or indirectly formed on another case and engageable with the first engaging member;
   the first engaging portion and the second engaging portion are either a male engaging portion having a retaining leg or a female engaging portion having a retaining hole engageable with the retaining leg, respectively; and the twist alarm means is comprised of a detachment mechanism to dismount the retaining leg from the retaining hole when the connecting member is twisted along with twisting of the airbag between the cases.

7. The head-protecting airbag apparatus according to claim 6, wherein:

the male engaging portion includes a plate-shaped base plate and the retaining leg that is formed on the base plate and includes a pair of symmetrical unciform members; and each of the unciform members includes a shank projecting perpendicularly from the base plate and a head that bulges from the leading end of the shank in a generally triangular shape as viewed from a direction orthogonal to an opposing direction of the shanks for engagement with the retaining hole.

8. The head-protecting airbag apparatus according to claim 6, wherein the detachment mechanism includes a detachment alarm mechanism for warning the detachment of the retaining leg from the retaining hole by other condition than a configuration of the retaining leg from the retaining hole.

9. The head-protecting airbag apparatus according to claim 8, wherein the detachment alarm mechanism is comprised of making a hitting sound when the retaining leg hits a peripheral area of the retaining hole in coming off from the retaining hole.

10. The head-protecting airbag apparatus according to claim 9, wherein:

the male engaging portion includes a plate-shaped base plate and the retaining leg that is formed on the base plate and includes a pair of symmetrical unciform members;

each of the unciform members includes a shank projecting perpendicularly from the base plate and a head that bulges from the leading end of the shank in a generally triangular shape as viewed from a direction orthogonal to an opposing direction of the shanks for engagement with the retaining hole; and the shanks are coupled together by a thin plate-shaped rib for enhancing elastic deformation stress generated when the shanks are flexed close to each other.

11. The head-protecting airbag apparatus according to claim 8, wherein:

at least one of butting planes of the male engaging portion and female engaging portion engaging with each other has a colored region that is colored by a color different from surroundings; and the detachment alarm mechanism is comprised of exposing the colored region upon detachment of the retaining leg from the retaining hole.

12. The head-protecting airbag apparatus according to claim 1, wherein each of the cases comprises mounting flanges adapted to be fastened on the vehicle body together with the mounting portions of the airbag.

* * * * *